United States Patent

Van Horn

[11] Patent Number: 5,831,811
[45] Date of Patent: Nov. 3, 1998

[54] PORTABLE COVER FOR ELECTRONIC APPLIANCE

[76] Inventor: Sandra Ann Van Horn, 11105 Scarritt, Sugar Creek, Mo. 64054

[21] Appl. No.: 651,810

[22] Filed: May 20, 1996

[51] Int. Cl.[6] .................................................... H02B 1/00
[52] U.S. Cl. ........................... 361/600; 150/165; 206/586
[58] Field of Search ................................ 174/66, 67, 135; 150/161–165; 206/521, 586; 361/699, 679, 814; B65D 81/14, 65/02, 85/00

[56] References Cited

U.S. PATENT DOCUMENTS 4,950,842  8/1990  Menninga ................................ 174/67
5,474,185  12/1995  Franke ..................................... 150/165
5,621,387  4/1997  Phillips et al. .......................... 361/600

Primary Examiner—Gregory D. Thompson
Attorney, Agent, or Firm—Shook, Hardy & Bacon L.L.P.

[57] ABSTRACT

A portable cover for covering at least a frontal portion of an electronic appliance. The cover is integrally formed of tinted, transparent plastic and is generally rectangular in shape. The cover has an open back portion for receiving a frontal portion of an electronic appliance, such as a VCR or stereo. A small lip extends upwardly from the bottom of the cover, at its rearward edge, to serve as a barrier against removal of the cover from the frontal portion of the electronic appliance. A plurality of pads are located on inner faces of the cover to prevent scratching of the appliance during placement and removal of the cover.

12 Claims, 1 Drawing Sheet

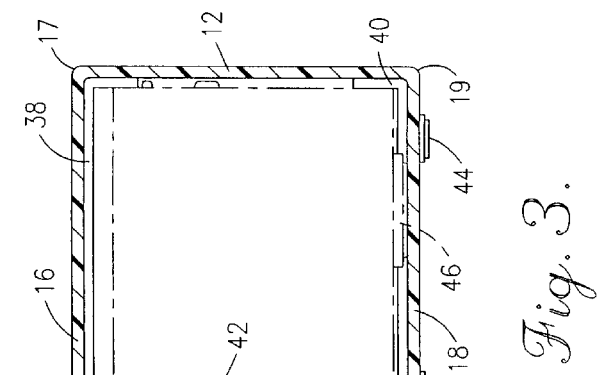
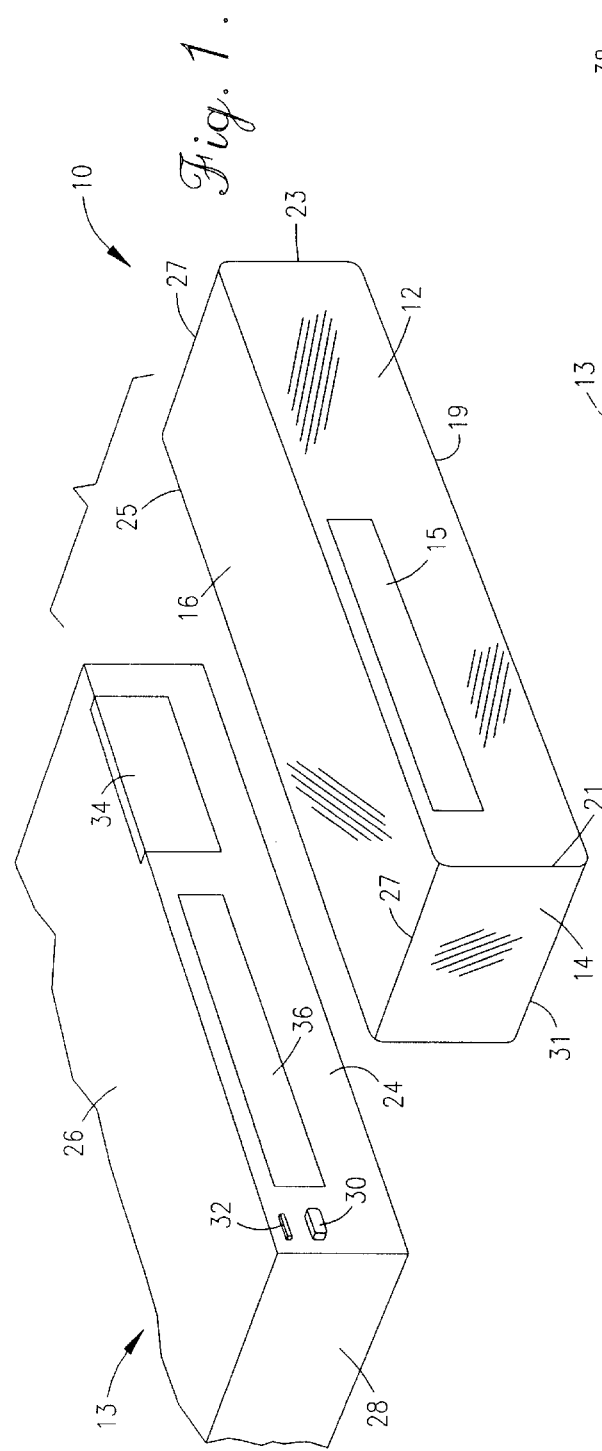
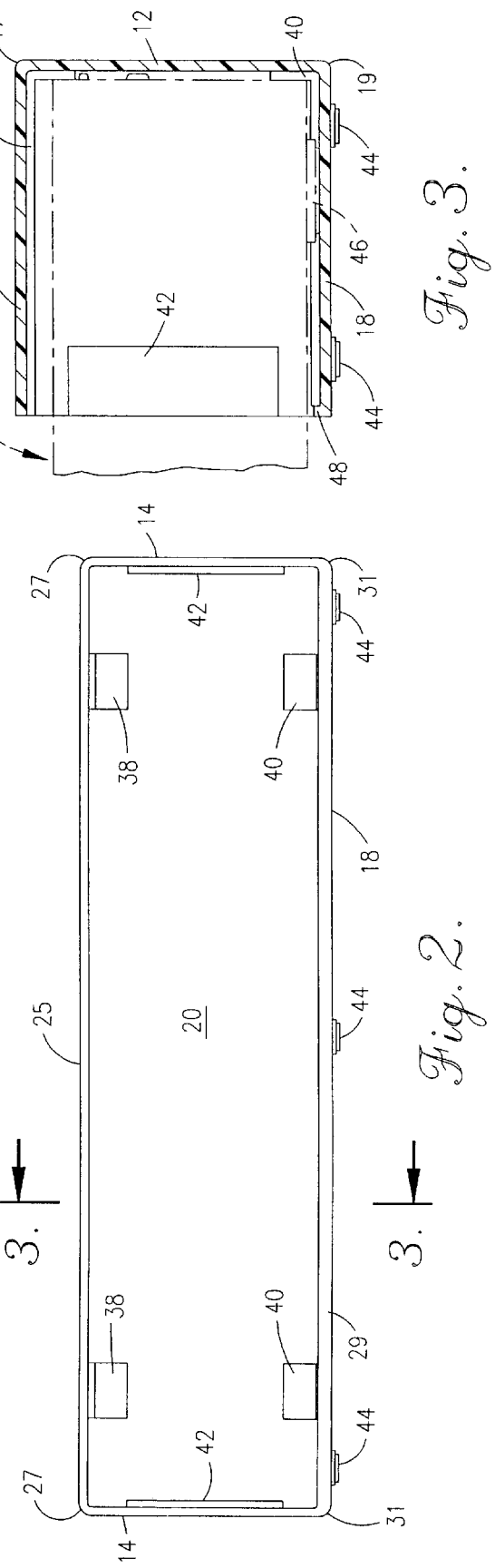

PORTABLE COVER FOR ELECTRONIC APPLIANCE

BACKGROUND OF THE INVENTION

1. Field of the Invention

The present invention relates in general to a portable cover for electronic appliances, such as stereos and video cassette recorders (VCRs). More specifically, the present invention relates to a rectangular box-like structure, having an open back, for slipping over at least a frontal portion of an electronic appliance. The present invention also relates to the combination of such a cover and appliance.

2. Description of the Related Art

Electronic appliances, such as stereos and video cassette recorders, enjoy widespread popularity. The use of such entertainment equipment continues to be increasingly popular in view of rapid advancement in the electronic's industry.

Because of the substantial expense of items such as video cassette recorders and stereos, it is desirable to keep these electronic entertainment appliances in good working condition. However, there are many factors which contribute to the deterioration of such appliances. For instance, such appliances are often used only periodically. During periods of nonuse, dust tends to collect on the surface of the appliance, and often seeps into the interior of the appliance where it may damage electronic components. Additionally, particularly in domestic environments, these appliances are often exposed to the inquisitive grasps of small children and the destructive efforts of pets. Additionally, in some instances, access by small children to electronic entertainment equipment can be hazardous: for instance, children may get fingers caught in the tapedeck of a video cassette recorder, or knobs and buttons commonly found on such devices may be broken off and potentially swallowed.

Accordingly, the need exists for an inexpensive device for covering, and thereby shielding, a frontal portion of electronic appliances, such as stereos and video cassette recorders. The need exists for such a device to protect against damage of the appliance, as well as to protect individuals or pets that may be prone to injure themselves when accessing the appliance. The present invention overcomes the drawbacks of the prior art and fills these and other needs.

SUMMARY OF THE INVENTION

An object of the present invention is to protect electronic appliances, such as stereos or video cassette recorders.

An object of the present invention is to provide an inexpensive cover for protecting a frontal portion of an electronic appliance, such as a stereo or video cassette recorder.

An object of the present invention is to provide a cover for an electronic appliance that is easily removed by an adult or even a youth with instruction on proper use of the cover, but which resists removal by young children.

It is an additional object of the present invention to provide a cover for an electronic appliance, such as a stereo or video cassette recorder, that still permits electronic signals transmitted from a remote control to control the appliance without removal of the cover.

These and other objects are achieved by a generally rectangular box-like structure, having an open back, for covering the frontal portion of an electronic appliance such as a stereo or video cassette recorder. The cover of the present invention has an elongate front, two end walls, a top, and a bottom. The rear of the cover is open so that the cover may receive at least a frontal portion of the electronic appliance.

The cover has a number of pads positioned at optimal locations within its interior so as to prevent damage, such as scratching, of the electronic appliance during placement and removal of the cover. Moreover, pads located on the inside surface of the front of the cover allow a front face of the electronic appliance to abut up against the pads, while leaving space for knobs, buttons, or other devices located on the front face of the appliance. Additionally, the rear edge of the bottom of the cover preferably terminates in an upwardly extending lip. This lip is useful for catching on foot members, commonly found on such appliances, to resist removal of the cover from the frontal portion of the appliance. The cover also preferably has one or more foot members of its own located on the lower surface of the bottom of the cover. These foot members are preferably formed of rubber to provide resistance against sliding.

The cover of the present invention is preferably formed of an integral piece of plastic. The plastic is preferably transparent, although tinted. In one embodiment, indicia or graphics are located on a face of the cover so as to make the cover appear to be a stereo, video cassette recorder, or other appliance.

BRIEF DESCRIPTION OF THE DRAWINGS

The objects and features of the invention noted above are explained in more detail with reference to the drawings, in which like reference numerals denote like elements, and in which:

FIG. 1 is a frontal perspective view of the present invention;

FIG. 2 is a rear elevational view of the cover of the present invention; and

FIG. 3 is a cross sectional view taken along line 3—3 of FIG. 2.

DETAILED DESCRIPTION OF THE INVENTION

With reference initially to FIG. 1, a cover of the present invention is denoted generally by the reference numeral 10. As described in detail below, cover 10 is useful for covering, and thereby shielding, at least a frontal portion of an electronic appliance, such as electronic appliance 13. As shown in FIG. 1, electronic appliance 13 takes the form of a video cassette recorder (VCR). Appliance 13 has a rectangular front 24, a top 26, sides 28 (one shown), a power switch 30 and power indicator light 32, a covered control panel, indicated by reference numeral 34, and a tape deck 36. It will be appreciated that these items are representative of a VCR, but that other controls and features are commonly found on electronic appliances. Moreover, it will be understood and appreciated that appliance 13 may be any type of electronic appliance, such as a stereo, compact disc player, cassette player, etc.

Cover 10 is preferably integrally formed of plastic. Specifically, cover 10 is preferably transparent, yet tinted. Although any color may be utilized, a deep gray or charcoal appearance is preferred. Front 12 of cover 10 has an upper edge 17 and a lower edge 19, which correspond with front edges of top 16 and bottom 18, respectively. Front 12 of cover 10 also has side edges 21, 23 which correspond with front edges of respective end walls 14. Top 16 also has a rear edge 25 and side edges 27 which side edges 27 correspond with top edges of respective side walls 14. Bottom 18 also has a rear edge 29, terminating in upwardly extending lip 48 as describe below, and side edges 31 corresponding with bottom edges of respective end walls 14.

With additional reference to FIG. 2, (which shows a rear elevational view of cover 10), cover 10 has a front 12 having a rear face 20, end walls 14, a top 16 and a bottom 18. If desired, graphics or indicia 15 may be placed on the outer surface of front 12. For instance, graphics or indicia indicative of the appearance of an electronic appliance may be, if desired, located on front 12.

As illustrated in FIG. 2, cover 12 has a pair of upper pads 38 and a pair of lower pads 40. These pads are preferably formed of foam or felt, or some other, soft or compressible material, such as cloth, and are adhesively attached to their respective associated inner surfaces of cover 12. With additional reference to FIG. 3, each upper pad 38 has a first portion adhered to the top 16 of cover 12, and a second portion adhered to the rear face 20 of front 10. Similarly, each lower pad 40 has a first portion adhered to the bottom 18 of the cover 12, and a second portion adhered to rear face 20 of front 12. Padded strips 42 are located on the inner surfaces of respective end walls 14. It will be understood and appreciated that the precise nature and positioning of the pads 38 and 44, and the strips 42, can be varied or altered as desired without departing from the spirit and scope of the present invention. Specifically, these pads and strips are useful for protecting appliance 13 during use, and particularly during placement and removal, of cover 10.

Cover 10 has a plurality of foot members 44 positioned on a lower surface of bottom 18 thereof. Foot members 44 are preferably small rubber elements adhered to bottom 18, which serve to provide frictional resistance to forces that would otherwise cause cover 10 to slide on the surface upon which it is resting.

As shown in FIG. 3, the rearward end of bottom 18 of cover 10 terminates in an upwardly extending lip/rim 48. The appliance 13, shown in broken lines in FIG. 3, has foot members 46. It will be understood that there is an additional foot members 46 located at the opposite side of the appliance 13. Upwardly extending rim 48 is adapted to catch on, or engage with, foot members 46 of appliance 13 when an attempt is made to slide cover 10 from its position about a frontal portion of appliance 13.

Cover 10 is preferably dimensioned such that its interior cavity is slightly taller and wider than the height and width, respectively, of the appliance 13. Preferably, cover 10 has a height of approximately five to six inches, a length of approximately eighteen to twenty inches, and a depth of approximately 6 to ten inches.

In use, cover 10 is positioned over a frontal portion of appliance 13, such that cover 10 covers the entirety of face 24 of appliance 13. Specifically, placement of cover 10 over a frontal portion of appliance 13 is accomplished by slightly lifting or tilting a frontal portion of appliance 13 upwardly, and then sliding the cover 10 about a frontal portion of the appliance 13, such that at least a frontal portion of the appliance 13 is received within the cover 10, as shown in FIG. 3. When in place, electronic signals, such as radio frequency signals or infrared signals, may still be utilized from a remote control to control the electronic appliance. This is particularly true due to the preferred generally transparent nature of cover 10. Removal of cover 10 from the appliance 13 is accomplished by slightly lifting or tilting a frontal portion of the appliance 13, or a combination of the appliance 13 and cover 10, and sliding the cover 10 off of the appliance 13.

Although the cover 10 is lightweight in construction, it will be appreciated that its structure is such that it provides rigid protection against damage to a frontal portion, and particularly a face, of an electronic appliance, such as a stereo or video cassette recorder. Moreover, in accordance with an important aspect of the present invention, the weight of the appliance 13 upon the bottom 18 of the cover 10, as well as the provision of the upwardly extending lip 48 which serves to resist removal of the cover 10 from appliance 13, requires some degree of strength and dexterity to remove cover 10. Thus, small children and pets, which are often attracted to an uncovered appliance, are unable to access its controls, thereby potentially saving the appliance from damage and the child from harm.

In a variation of the foregoing described cover 10, cover 10 is constructed of only a bottom portion and a front portion extending upwardly from a front edge of the bottom portion. The front portion at least substantially covers a front face of the appliance, to thereby shield the face.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by, and is within the scope of, the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A portable cover, in combination with an electronic appliance having a generally rectangular face portion and a frontal portion adjacent the face portion, said cover comprising:

a bottom having a front edge extending over only the frontal portion and a rear portion terminating in an upwardly extending lip;

a front panal extending upwardly from said front edge of said bottom, wherein the frontal portion of said electronic appliance rests on said bottom and wherein said front panel at least substantially covers said face portion of said electronic appliance;

wherein the cover comprises an integrally formed structure further having a generally rectangular top portion, and first and second end walls, said structure thereby defining an interior cavity, wherein said structure is open at a rear portion thereof, said rear portion being opposite said front panel, wherein said structure covers at least a said frontal portion of said electronic appliance.

2. The combination as set forth in claim 1 wherein said integrally formed structure is formed of transparent plastic.

3. The combination as set forth in claim 1 wherein a bottom of said electronic appliance rests on an inner face of said bottom of said cover.

4. The combination as set forth in claim 1 wherein each of said front panel, said top portion, and said end walls has an inner face, and wherein at least one of said inner faces has a protective pad thereon.

5. The combination as set forth in claim 1 wherein said front panel has graphics thereon.

6. The combination as set forth in claim 1 wherein said bottom has a lower face having a plurality of foot members thereon.

7. A portable cover, in combination with an electronic appliance having a generally rectangular face portion, said cover comprising:

a bottom having a front edge;

a front panel extending upwardly from said front edge of said bottom wherein at least a portion of said electronic appliance rest on said bottom and wherein said front panel at least substantially covers said face portion of said electronic appliance;

an integrally formed structure further having a generally rectangular too portion and first and second end walls, said structure thereby defining an interior cavity, wherein said structure is open at a rear portion thereof, said rear portion being opposite said front panel, wherein said structure covers at least a frontal portion of said electronic appliance;

a lower face on said bottom, the lower face having a plurality of foot members thereon; and said foot members are comprised of rubber.

8. A portable cover, in combination with an electronic appliance having a generally rectangular face portion and a bottom portion, said portable cover comprising:

a rectangular front portion having upper and lower edges and first and second side edges;

a rectangular bottom portion having front and rear edges and first and second side edges, wherein said bottom portion extends perpendicularly from said lower edge of said front portion;

first and second side walls, each said side wall having a front edge and a rear edge and top and bottom edges, wherein each said side-wall extends perpendicularly from a corresponding side edge of said front portion and extends upwardly from a corresponding side edge of said bottom portion;

a top portion having front and rear edges and first and second side edges, wherein said top portion extends perpendicularly from said upper edge of said front portion and further extends between said top edges of said first and second side walls, said front portion, said bottom portion, and said side walls thereby forming a structure defining a cavity, wherein said structure covers said face portion of said electronic appliance; and a plurality of foot members located on a lower surface of said appliance, wherein at least a portion of said plurality of foot members of said electronic appliance rest on an inner face of said bottom portion of said cover;

a lip member extending upwardly from said rear edge of said bottom portion of said cover; and a plurality of protective pads positioned on said cover within said cavity.

9. The combination as set forth in claim 8 wherein the electronic device comprises a VCR.

10. A portable cover comprising:

a rectangular shaped structure having a front, first and second end walls, a top, and a bottom with a rear edge, said structure having an open rear portion thereof, said rear portion being opposite said front;

an upwardly extending lip extending upwardly from the rear edge of the bottom; and a plurality of foot members extending from a lower surface of said bottom.

11. The portable cover as set forth in claim 10 further comprising a depth for extending over a frontal portion of an electronic device, and the depth being selected to extend only over the frontal portion of the electronic device.

12. The portable cover as set forth in claim 12 wherein the depth is in the range of approximately six inches to approximately ten inches.

\* \* \* \* \*